United States Patent
Ahmed et al.

(10) Patent No.: US 11,591,509 B2
(45) Date of Patent: Feb. 28, 2023

(54) IRON SULPHIDE SCALE REMOVAL FROM OIL AND GAS WELLS USING GREEN FORMULATION

(71) Applicants: Qatar Foundation for Education, Science and Community Development, Doha (QA); Qatar University, Doha (QA)

(72) Inventors: Musa Ahmed, Doha (QA); Ibnelwaleed Ali Hussein, Doha (QA); Abdulmujeeb Onawole, Doha (QA); Mohammed A. Saad, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 0 days.

(21) Appl. No.: 17/064,819

(22) Filed: Oct. 7, 2020

(65) Prior Publication Data

US 2021/0108124 A1    Apr. 15, 2021

Related U.S. Application Data

(60) Provisional application No. 62/914,012, filed on Oct. 11, 2019.

(51) Int. Cl.
    *C09K 8/532*      (2006.01)
    *C01B 35/12*      (2006.01)

(52) U.S. Cl.
    CPC ............ *C09K 8/532* (2013.01); *C01B 35/121* (2013.01)

(58) Field of Classification Search
None
See application file for complete search history.

(56) References Cited

U.S. PATENT DOCUMENTS 4,401,789 A * 8/1983 Gideon ..................... C08F 2/10
     166/266
4,582,139 A * 4/1986 Childs ..................... C04B 24/40
     166/293

(Continued)

OTHER PUBLICATIONS

Mohamed Mahmoud, et al.; "Development of e?cient formulation for the removal of iron sulphide scale in sour production wells"; May 4, 2018; https://doi.org/10.1002/cjce.23241; (2 pages).

(Continued)

*Primary Examiner* — John J Figueroa
(74) *Attorney, Agent, or Firm* — K&L Gates LLP

(57) ABSTRACT

New formulation for pyrite scale removal from oil and gas wells and a method of pyrite scale removal are disclosed. The chemical formulation is composed of $K_2B_4O_7 \cdot 4H_2O$, in a concentration of about 9-20 wt. % of the composition, preferably about 14 wt. % of the composition. The new formulation has the ability to dissolve pyrite without generation of the toxic $H_2S$. Furthermore, the new formulation is cheaper and has very low corrosion rate compare to 15 wt. % HCl with corrosion inhibitor. The disclose method uses the disclosed new formulation to dissolve iron sulphide scale, performed at about 100-150° C. and about 500-2000 psi.

13 Claims, 8 Drawing Sheets

(56) References Cited

U.S. PATENT DOCUMENTS

2016/0060504 A1* 3/2016 Dawson ................ C09K 8/588
 166/300
2017/0362492 A1 12/2017 Mahmoud et al.

OTHER PUBLICATIONS

Wim Buijs, et al.; "Molecular Modeling Study toward Development of H2S-Free Removal of Iron Sulfide Scale from Oil and Gas Wells"; I&EC Research; 2018; (10 pages).

* cited by examiner

| Part | Description |
|---|---|
|  | Manual valve |
|  | Pneumatic valve |
|  | Vent |
|  | Stirrer |
|  | Pressure vassal |
|  | booster pump |
|  | Vacuum Pump |
|  | Automatic sampling system |
|  | The reactor |
|  | The Reservoir (Formulations tank) |

IRON SULPHIDE SCALE REMOVAL FROM OIL AND GAS WELLS USING GREEN FORMULATION

CROSS REFERENCE TO RELATED APPLICATION

The present application claims priority to U.S. Provisional Patent Application No. 62/914,012, filed Oct. 11, 2019, the disclosure of which is incorporated into this specification by reference in its entirety.

BACKGROUND

A persistent challenge facing the upstream sector of the oil and gas industry is iron sulphide scales. This is especially true in sour gas wells, which operate at high pressure and high temperature. Iron sulphide scales hinder the assurance of flow by being deposited near well bore area of the reservoir. This brings about formation damage, blockage of the downhole tubular, and ultimately leads to the abrupt stopping of production and operational processes. Hydrochloric acid is frequently used as a chemical dissolver for scale removal. Yet, there are many disadvantages of this solution, such as generation of the toxic hydrogen sulphide, $H_2S$, the high corrosion rate, and the low dissolving power for hard iron sulphides scales i.e. pyrite and marcasite in which the iron to sulphur ratio is greater than 1:1 [Wang, X.; Qu, Q.; Berry, S.; Cutler, J. Iron Sulfide Removal: A Nonacidic Alternative to Hydrochloric Acid Treatment. In SPE European Formation Damage Conference & Exhibition; Society of Petroleum Engineers, 2013. https://doi.org/10.2118/165199-MS]. Recently, new green formulations using chelating agents [Ahmed M, Saad M A, Hussein I A, Onawole A T, Mahmoud M. Pyrite Scale Removal using Green Formulations for Oil and Gas Applications: Reaction Kinetics. Energy & Fuels 2019:acs.energyfuels.9b00444. doi:10.1021/acs.energyfuels.9b00444; Mahmoud M, Hussein I A, Sultan A, Saad M A, Buijs W, Vlugt T J H. Development of Efficient Formulation for the Removal of Iron Sulphide Scale in Sour Production Wells. Can J Chem Eng 2018; 9999:1-8. doi:10.1002/cjce.23241; MAHMOUD M, IA Hussein—U.S. patent application Ser. No. 15/697,888, 2017 undefined. Method for removing iron sulfide scale from oil well equipment. Google Patents 2019; 10323173: 1-19; Onawole A T, Hussein I A, Sultan A, Abdel-Azeim S, Mahmoud M, Saad M A. Molecular and electronic structure elucidation of Fe 2+/Fe 3+ complexed chelators used in iron sulphide scale removal in oil and gas wells. Can J Chem Eng 2019; 97:2021-7. doi:10.1002/cjce.23463] a cheap salt as a converter have been developed. It has the ability to dissolve iron sulphide field scale that contain Pyrrhotite ($Fe_7S_8$), Pyrite ($FeS_2$) & Siderite ($Fe_2CO_3$). Furthermore, the new formulation is $H_2S$— free with very low corrosion rates. In addition, the new formulation was tested using density functional theory (DFT) which corroborated the chelating ability of Di-ethylene Tri-amine Penta Acetic Acid (DTPA) in the removal of iron sulphide scale [Onawole A T, Hussein I A, Sultan A, Abdel-Azeim S, Mahmoud M, Saad M A. Molecular and electronic structure elucidation of Fe 2+/Fe 3+ complexed chelators used in iron sulphide scale removal in oil and gas wells. Can J Chem Eng 2019; 97:2021-7. doi:10.1002/cjce.23463; Buijs W, Hussein I A, Mahmoud M, Onawole A T, Saad M A, Berdiyorov G R. Molecular Modeling Study toward Development of $H_2S$-Free Removal of Iron Sulfide Scale from Oil and Gas Wells. Ind Eng Chem Res 2018; 57:10095-104. doi:10.1021/acs.iecr.8b01928.]. Further, the effect of pH of the green formulation on the dissolution of iron sulphide was studied, and it was concluded that the dissolution increases with the decrease of pH of the tested green formulations [Ahmed M, Onawole A, Hussien I, Saad M, Mahmoud M, Nimir H. SPE-193573-MS Effect of pH on Dissolution of Iron Sulfide Scales Using THPS 2019:1-9; Onawole A T, Hussein I A, Saad M A, Mahmoud M, Ahmed M E M, Nimir H I. Effect of pH on acidic and basic chelating agents used in the removal of iron sulfide scales: A computational study. J Pet Sci Eng 2019. doi:10.1016/j.petrol.2019.03.075]. Although there are many proposed solutions for pyrite dissolution yet, these solutions still have limitations, such as the lower solubility, higher cost, generation of $H_2S$ and the high corrosion rate. These limitations were the motivation for developing more efficient green formulations which is the subject of this disclosure.

SUMMARY

In one embodiment, a composition comprises potassium tetraborate tetrahydrate ($K_2B_4O_7 \cdot 4H_2O$).

In one embodiment, the potassium tetraborate tetrahydrate ($K_2B_4O_7 \cdot 4H_2O$) is in a concentration of 14 wt. % of the composition.

In one embodiment, a method comprises using the composition of claim 2 to dissolve iron sulphide scale, which is pyrite.

In one embodiment, no the toxic hydrogen sulphide ($H_2S$) is generated.

In one embodiment, the method is performed at 150° C. and 1000 psi.

BRIEF DESCRIPTION OF DRAWINGS

Features and advantages of the technology described herein may be better understood by reference to the accompanying figures in which:

FIG. 1c lists some of the main components of the equipment in FIG. 1a.

DETAILED DESCRIPTION

Figure 1A:
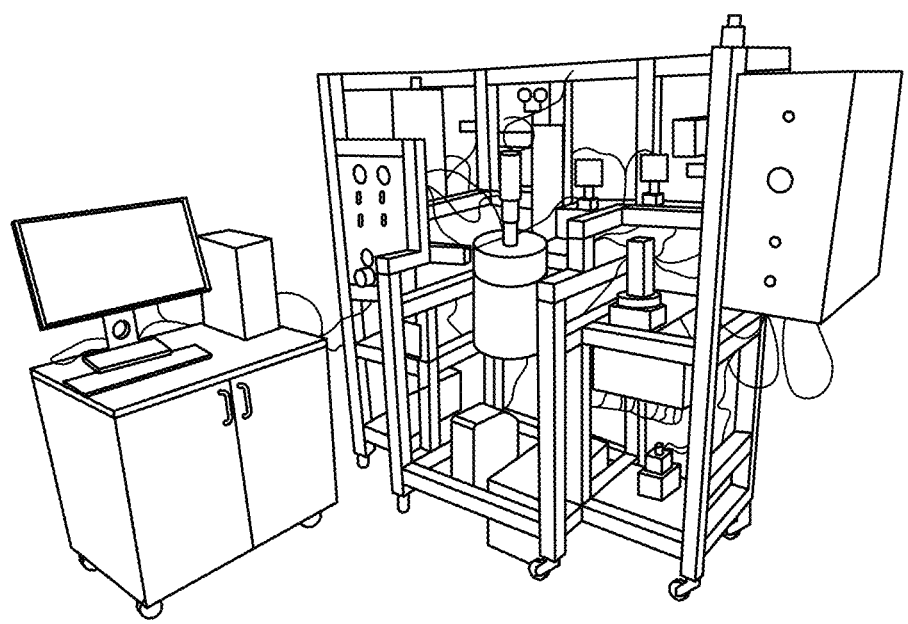
FIGS. 1a and 1b show a rotating disc apparatus: 1a) the equipment and ab) schematic of RDA.

All percentages are by weight of the total weight of the composition unless expressed otherwise. Similarly, all ratios are by weight unless expressed otherwise. When reference is made to the pH, values correspond to pH measured at 25° C. with standard equipment. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

In this disclosure, new green formulation for pyrite scale removal is disclosed. It is composed from about 1-20 wt. %, preferably about 14 wt. % potassium tetraborate tetrahydrate ($K_2B_4O_7$-$4H_2O$). The formulation has the ability to dissolve the toughest form of iron sulphide scale, which is pyrite without the generation of the toxic hydrogen sulphide ($H_2S$). The solubility of the scale in the new formulation is increased by 16% compared to previously reported green formulation of (20 wt. % DTPA+9 wt. % $K_2CO_3$). Furthermore, the novel formulation achieved corrosion rate lower by 25 times that of 15 wt. % HCl with corrosion inhibitor. In addition, the new formulation is cheaper since it is only composed from the 14 wt. % $K_2B_4O_7$-$4H_2O$ without the corrosion inhibitor.

In one aspect of the present disclosure, a composition may comprise potassium tetraborate tetrahydrate ($K_2B_4O_7$-$4H_2O$). In some embodiments, the potassium tetraborate tetrahydrate ($K_2B_4O_7$-$4H_2O$) may be in a concentration of about 9-20 wt. % of the composition. For example, the potassium tetraborate tetrahydrate ($K_2B_4O_7$-$4H_2O$) may be in a concentration of about 14 wt. % of the composition.

In another aspect of the present disclosure, a method of pyrite scale removal may be provided. The method may comprise providing a composition comprising potassium tetraborate tetrahydrate ($K_2B_4O_7$-$4H_2O$); and using the composition to dissolve iron sulphide scale. In some embodiments, the iron sulphide scale may comprise pyrite. In some embodiments, the potassium tetraborate tetrahydrate ($K_2B_4O_7$-$4H_2O$) is in a concentration of about 9-20 wt. % of the composition, preferably about 14 wt. % of the composition.

In the disclosed method, no toxic hydrogen sulphide ($H_2S$) is generated.

In some embodiments, the disclosed method may be performed at about 100-150° C., for example, about 100° C., about 110° C., about 120° C., about 130° C., about 140° C., about 150° C., about 100-110° C., about 110-120° C., about 120-130° C., about 130-140° C., or about 140-150° C.

In some embodiments, the disclosed method may be performed at about 500-2000 psi, for example, about 500-600 psi, about 600-700 psi, about 700-800 psi, about 800-900 psi, about 900-1000 psi, about 1000-1100 psi, about 1100-1200 psi, about 1200-1300 psi, about 1300-1400 psi, about 1400-1500 psi, about 1500-1600 psi, about 1600-1700 psi, about 1700-1800 psi, about 1800-1900 psi, about 1900-2000 psi, about 500 psi, about 600 psi, about 700 psi, about 800 psi, about 900 psi, about 1000 psi, about 1100 psi, about 1200 psi, about 1300 psi, about 1400 psi, about 1500 psi, about 1600 psi, about 1700 psi, about 1800 psi, about 1900 psi, or about 2000 psi.

The method of claim 3, which is performed at about 150° C. and about 1000 psi.

In some embodiments, the disclosed method may be performed for about 0.5-10 hours, for example, about 0.5 hour, about 1 hour, about 2 hours, about 3 hours, about 4 hours, about 5 hours, about 6 hours, about 7 hours, about 8 hours, about 9 hours, about 10 hours, about 0.5-1 hour, about 1-2 hours, about 2-3 hours, about 3-4 hours, about 4-5 hours, about 5-6 hours, about 6-7 hours, about 7-8 hours, about 8-9 hours, or about 9-10 hours.

Material and Methodology:

Material:

Pyrite rock sample was brought from Geology Superstore company. Cores of 1 inch in diameter was then drilled from the core sample. Finally, a 0.5-inch thickness and 1-inch diameter discs were prepared with one surface highly polished and smoothed. Only the polished surface of the disc will be subjected to the reaction with the chemical removal formulation while all the other surfaces will be isolated. This disclosure used potassium tetraborate tetrahydrate ($K_2B_4O_7$-$4H_2O$) (borax) supplied by Advanced Technology and Industrial CO., LTD and has 99.5% purity.

Material Characterization

The purity of the pyrite rock was determined using X-ray diffraction (XRD) spectroscopy. In addition, X-ray photoelectron spectroscopy (XPS) analysis was used to explain the changes in the pyrite sample both before and after being treated with the chelating agents and converter.

Figure 1B:
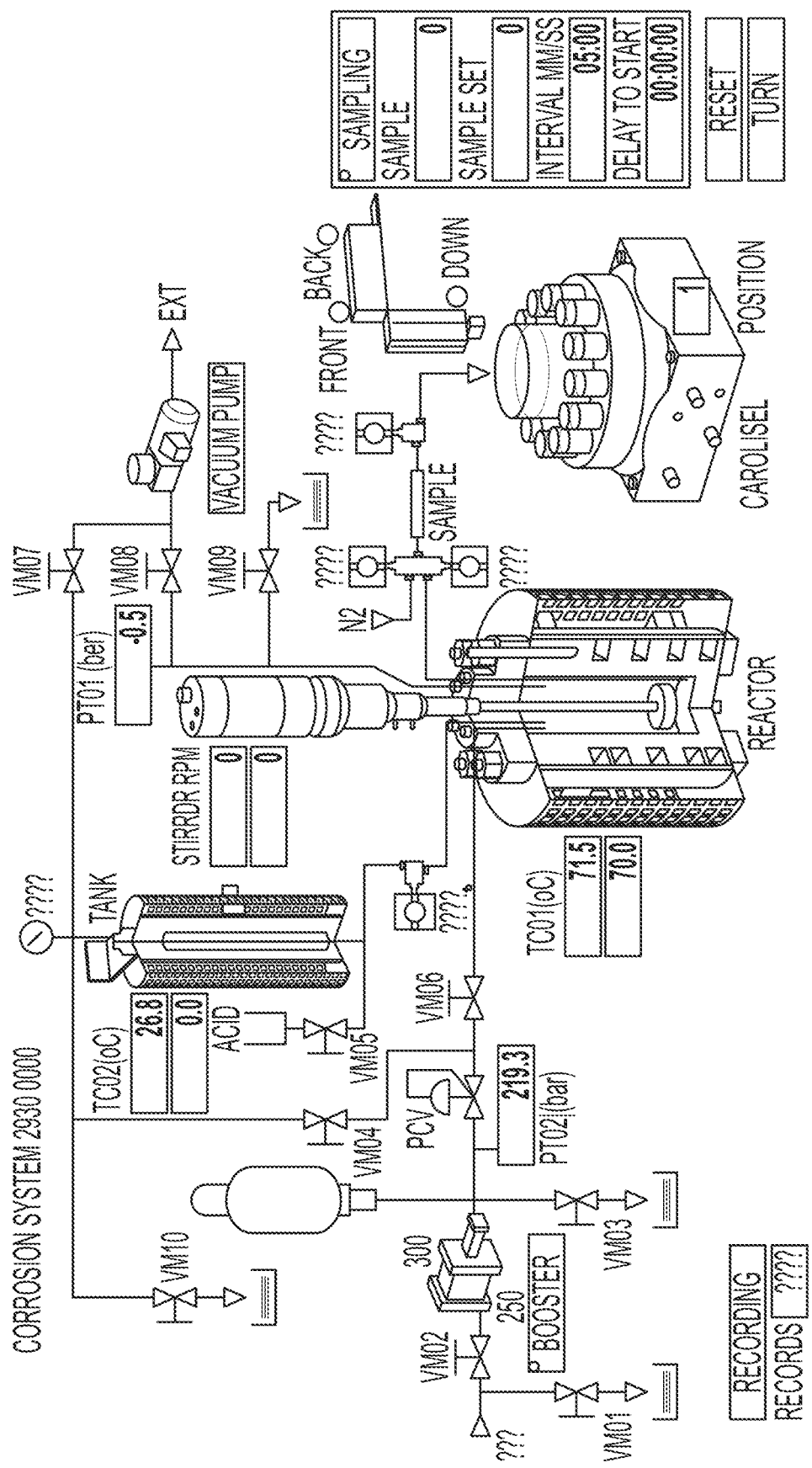
Figure 1C:
Figure 1C:
Figure 1C:
Figure 1C:
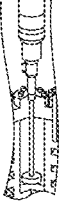
Figure 1C:
Figure 1C:
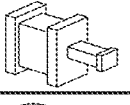
Figure 1C:
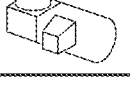
Figure 1C:
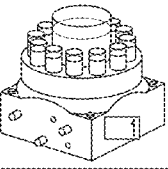
Figure 1C:
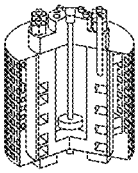
Figure 1C:
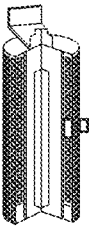

Reaction Rate Measurement Using Rotating Disk Apparatus (RDA):

The pyrite disc sample before each experiment was soaked into 0.1 N HCl for 30 min then rinsed used DI water to insure the reproducibility of the results. The discs then dried and weighted before mounting into the RDA using high accuracy balance with ±0.0001 g. The schematic of the rotating disc apparatus RDA used in this study is illustrated in FIGS. 1a and 1b. The main components (listed FIG. 1c) of the equipment are the reactor, the reservoir fluid tank, poster pump, vacuum pump, pressure vessel, automatic sampling system, network of connecting valves, and computer with monitoring and control system. In the reactor, the reaction between the solid surface and the chemical formulation took place.

Corrosion Test:

Two corrosion tests were conducted using potassium tetraborate and HCl formulations. The concentration of tetraborate tetrahydrate ($K_2B_4O_7$-$4H_2O$) that yield the maximums pyrite solubility which is about 14 wt. % was used. HCl is used in this work for the purposes of comparison as it is presently used in the oil and gas industry for the removal of iron sulfide scale. The corrosion experiments were performed using coupons made-up from mild steel (MS). The MS elemental composition is in Table 2 [El-Haddad M A M, Bahgat Radwan A, Sliem M H, Hassan W M I, Abdullah A M. Highly efficient eco-friendly corrosion inhibitor for mild steel in 5 M HCl at elevated temperatures: experimental & molecular dynamics study. Sci Rep 2019; 9:1-15. doi: 10.1038/s41598-019-40149-w]. The tests were accomplished in a rotating disc apparatus RDA illustrated in FIG. 1. The experiments were performed at about 150° C. (typical temperature in deep sour gas wells) and about 1000 psi. In these experiments, 14 wt % $K_2B_4O_7$-$4H_2O$ and 15 wt. % HCl, containing 1000 ppm of a corrosion inhibitor (CI), were employed. Both corrosion experiments were carried out for a period of about 6 hours.

TABLE 2 elemental composition of MS

| Element | Weight % |
|---------|----------|
| C | 0.128 |
| Si | 0.25 |
| Mn | 0.7 |
| S | 0.03 |
| P | 0.04 |
| Cu | 0.15 |
| Fe | Bal. |

The corrosion test from weight loss method was calculated using the following equation:

$$mm/y = 87.6 \times (W/DAT)$$

where: mm/y=corrosion rate in millimeter per year, W=weight loss in (milligrams), D=density of metal in (g/cm$^3$), A=sample surface area in (cm$^2$), T=exposure time of the metal sample in (hours).

Results and Discussions:

The dissolution of pyrite was studied using the rotating disk apparatus RDA. All experiments were performed at 1000 psi for 30 minutes. The effect of concentration of potassium tetraborate, temperature and the disc rotational speed on the pyrite dissolution was addressed. Surface chemistry of pyrite discs was analyzed before and after the treatment with the new formulation using XPS. Finally, the corrosion rate of the new formulation was measured using coupons from mild steel (MS). Then compared with corrosion rate of the currently used solution in the field which is 15 wt. % HCl with CI.

Figure 2:
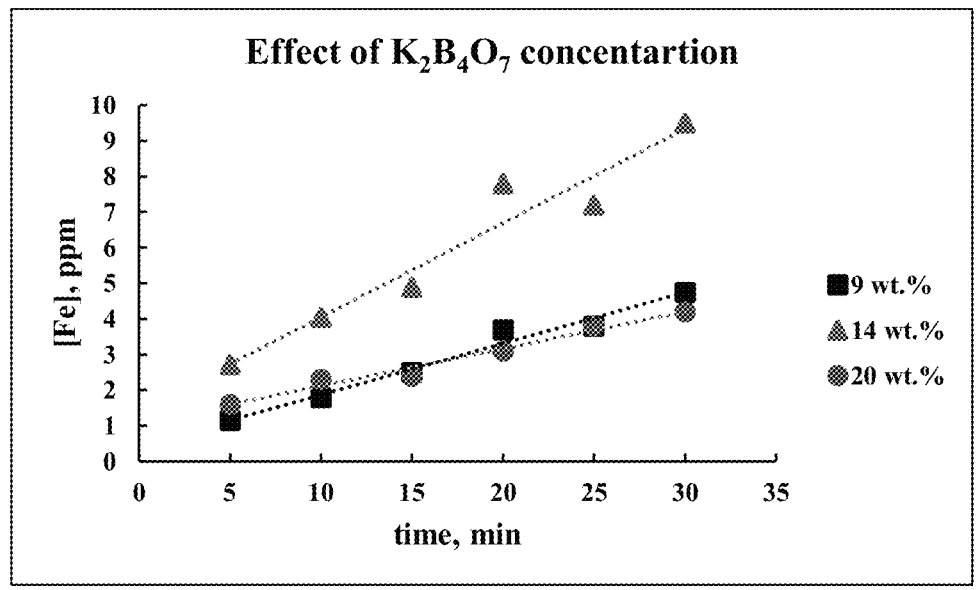
FIG. 2 shows the effect of $K_2B_4O_7$ concentration on the dissolution rate of pyrite (P, 1000 psi; T, 150° C.; rpm, 1200, 30 min) (iron concentration vs. time).
Figure 3:
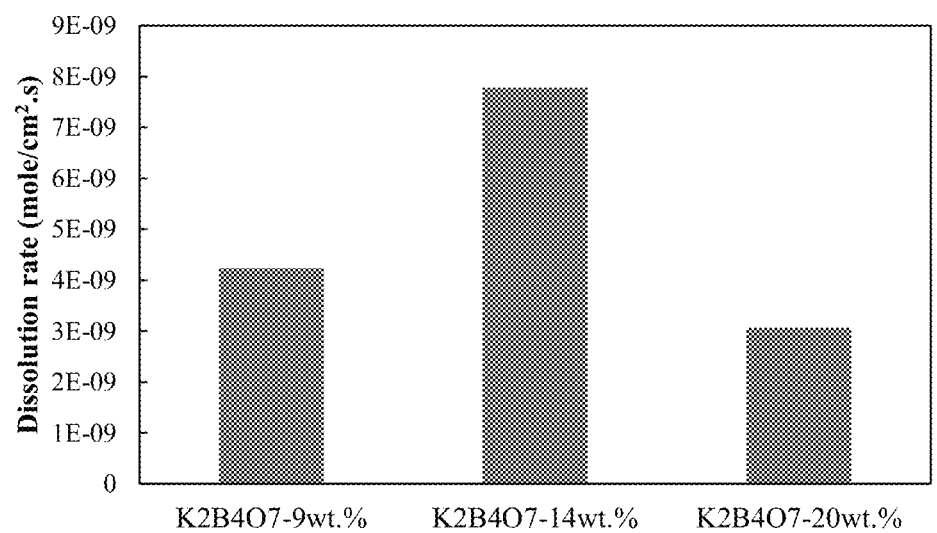
FIG. 3 shows the effect of $K_2B_4O_7$ concentration on the dissolution rate of pyrite (P, 1000 psi; T, 150° C.; rpm, 1200, 30 min) (dissolution rate vs. concentration).

Effect of Potassium Tetraborate Concentration on Pyrite Dissolution:

Three dissolution experiments using RDA were performed to study the effect of potassium tetraborate (borax) concentration on the dissolution of pyrite. All experiments were carried out at 1000 psi, 150° C. for a period of 30 minutes. Sample were taken each five minute then analyzed for iron concentration using ICP (OES) Perkin Elmer, model Optima 7300 DV. The reaction was increasing with the increase of the concentration up to 14 wt. %, then dramatically drop occurred when the concentration is enlarged to 20 wt. % as illustrated in FIG. 2 and FIG. 3. The optimum concentration of borax that yield maximum pyrite dissolution was found at 14 wt. %. Then the optimum concentration of potassium tetraborate was kept constant in the subsequent experiments that has been done to study the effect of temperature, the rotational speed of the disc as well as the corrosion test.

Figure 4:
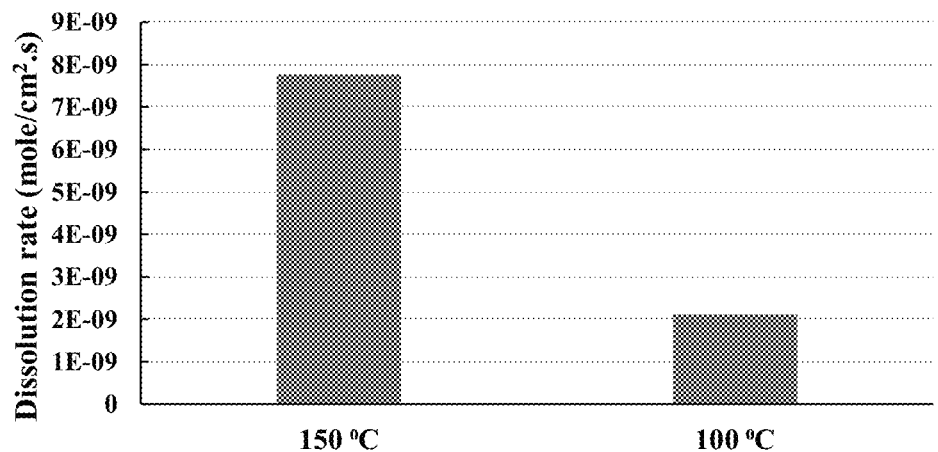
FIG. 4 shows the effect of temperature on the dissolution rate of pyrite using the new formulation (P, 1000 psi; rpm, 1200, 30 min) (reaction rate with temperature).
Figure 5:
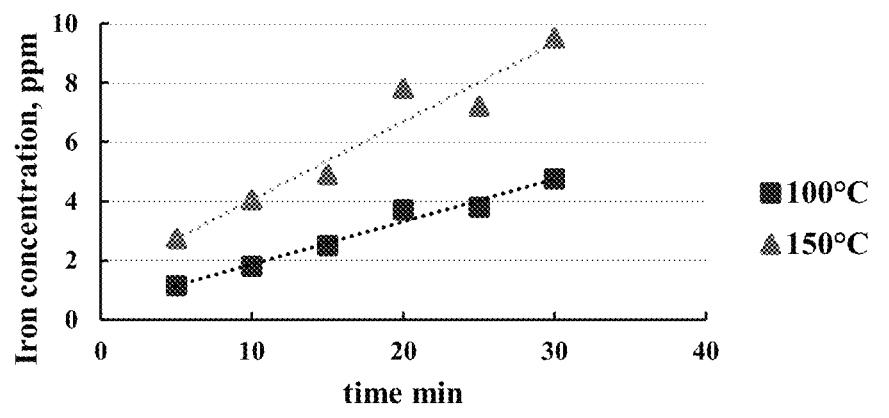
FIG. 5 shows the effect of temperature on the dissolution rate of pyrite using the new formulation (P, 1000 psi; rpm, 1200, 30 min) (iron concentration with time).

Effect of Temperature on Pyrite Dissolution:

The effect of temperature on the reaction rate of the new formulation with pyrite was addressed. Two experiments were conducted at 100 and 150° C. to represent both shallow and deep hydrocarbon wells respectively. All experiments were performed at 1200 rpm, 1000 psi for 30 minutes. Samples of 3 ml was taken every 5 minutes then analyzed for iron concentration using ICP-OES. From the plot of iron concentration with time the reaction rate was calculated. The results showed in FIG. 4 the dissolution rate of pyrite has increased 4 times when the temperature is raised from 100° C. to 150° C. Also, FIG. 5 revealed that the iron concentration after 30 minute almost doubled with elevation of the temperature.

Figure 6:
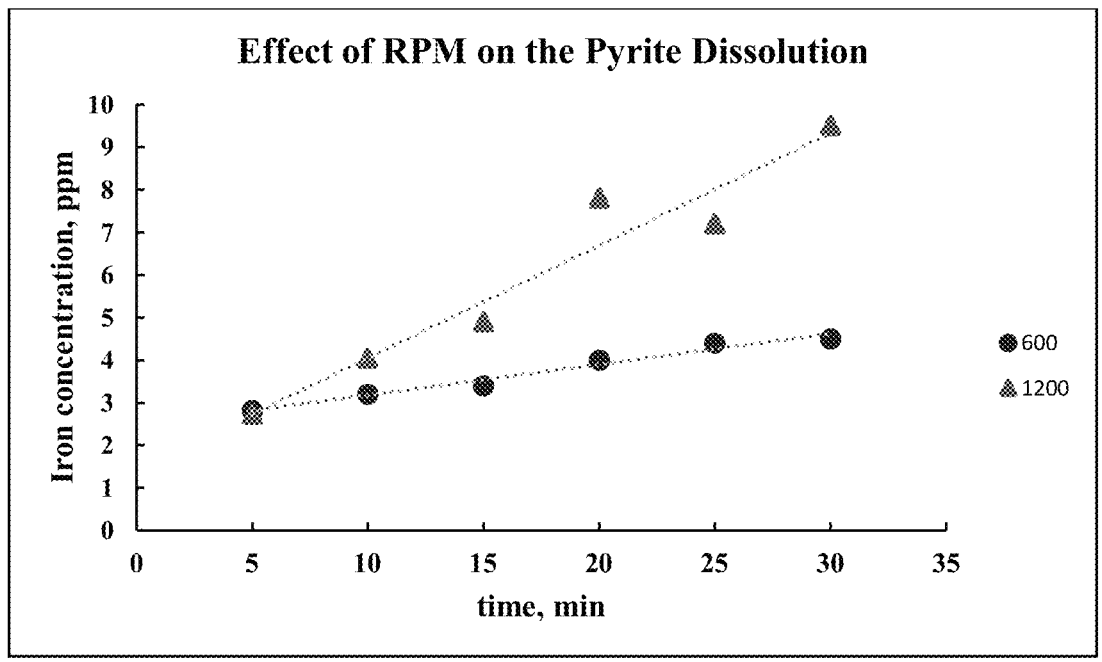
FIG. 6 shows the effect of disc rotational speed on the dissolution rate of pyrite using the new formulation (P, 1000 psi; T, 150° C.; time, 30 min) (iron concentration with time).

Effect Disc Rotational Speed on Pyrite Dissolution:

The effect of the speed of the rotating disc on the dissolution rate of pyrite was also addressed. Two RDA experiments were conducted to study this effect. Pressure, temperature and time were held constant while the rpm was changing. All tests were conducted at 1000 psi, 150° C. for a period of 30 minutes. Effluent samples of 3 ml were taken every five minute then analyzed for iron concentration using ICP (OES). Two rpm were used 600 and 1200. The results showed that the reaction rate of pyrite with new formulation is significantly affected with the rpm. FIG. 6 showed that the dissolution rate of pyrite was increasing with the increase of disc rotational speed suggesting that the reaction is mass transfer limited.

Figure 7:
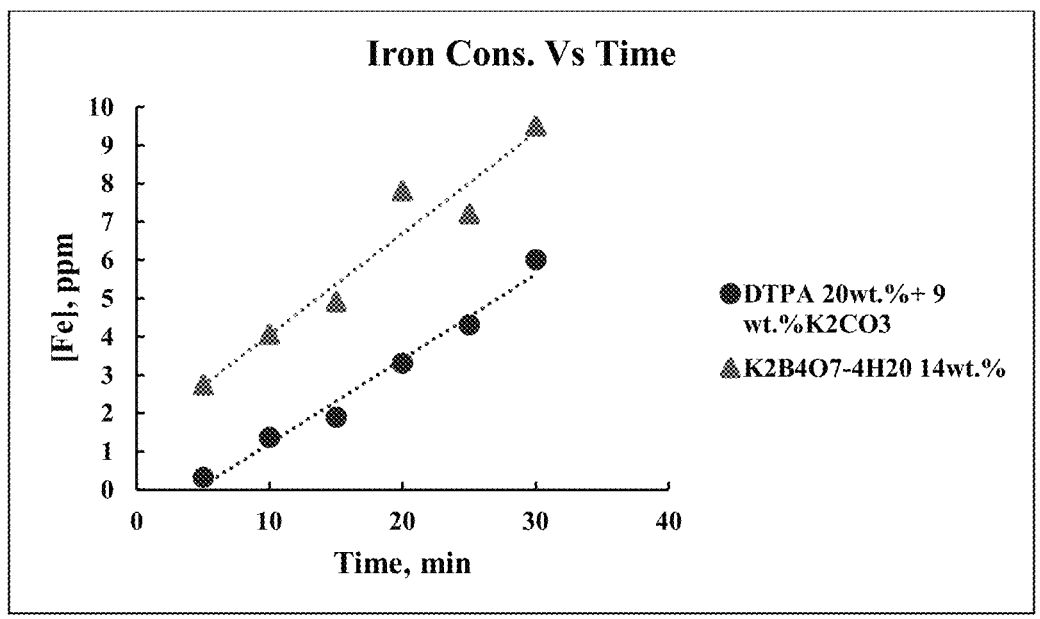
FIG. 7 shows the comparison of the Iron concentration with time using the new formulation and the DTPA/$K_2CO_3$ formulation (P, 1000 psi; T, 150° C.; rpm, 1200; time, 30 min).
Figure 8:
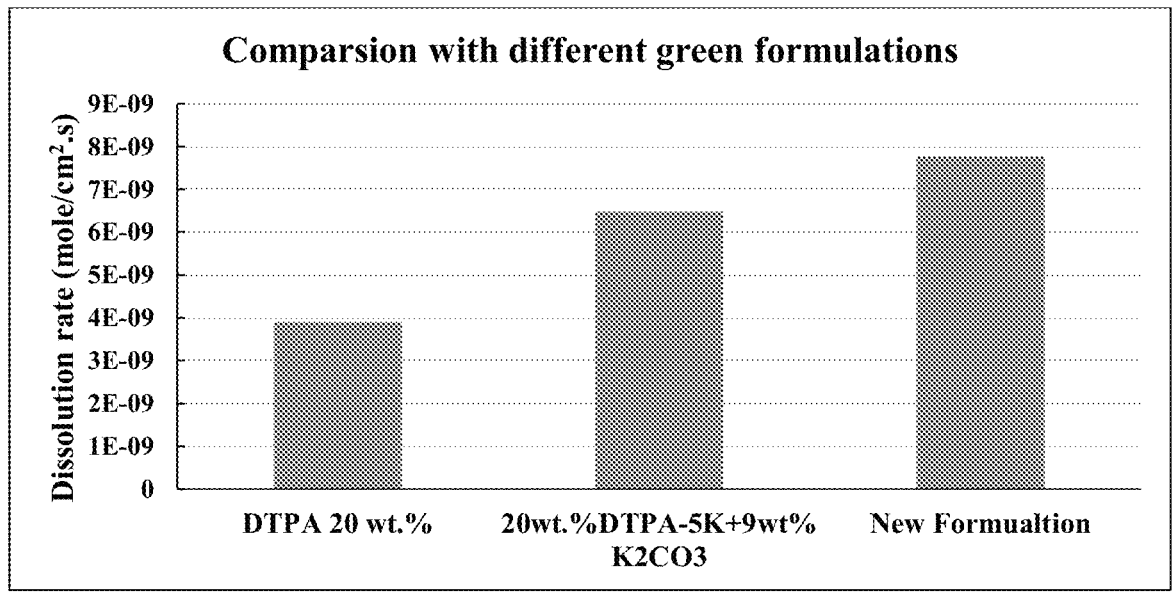
FIG. 8 shows the comparison of the dissolution rate of pyrite using the new formulation and the DTPA/$K_2CO_3$ formulation (P, 1000 psi; T, 150° C.; rpm, 1200; time, 30 min).

Comparisons:

The new formulation of 14 wt. % borax achieved pyrite dissolution that surpassed our previous formulation of chelating agent and converter [Ahmed M, Saad M A, Hussein I A, Onawole A T, Mahmoud M. Pyrite Scale Removal using Green Formulations for Oil and Gas Applications: Reaction Kinetics. Energy & Fuels 2019: acs.energyfuels.9b00444. doi:10.1021/acs.energyfuels.9b00444; Mahmoud M, Hussein I A, Sultan A, Saad M A, Buijs W, Vlugt T J H. Development of Efficient Formulation for the Removal of Iron Sulphide Scale in Sour Production Wells. Can J Chem Eng 2018; 9999:1-8. doi:10.1002/cjce.23241; MAHMOUD M, IA Hussein—U.S. patent application Ser. No. 15/697,888, 2017 undefined. Method for removing iron sulfide scale from oil well equipment. Google Patents 2019; 10323173:1-19; Onawole A T, Hussein I A, Sultan A, Abdel-Azeim S, Mahmoud M, Saad M A. Molecular and electronic structure elucidation of Fe 2+/Fe 3+ complexed chelators used in iron sulphide scale removal in oil and gas wells. Can J Chem Eng 2019; 97:2021-7. doi:10.1002/cjce.23463]. The reaction rate of the new formulation has shown an improvement of 16% compared to DTPA/converter chemical formulation. The incremental of the dissolution of pyrite with the use of the new formulation is clear in FIG. 7 and FIG. 8.

Figure 9:
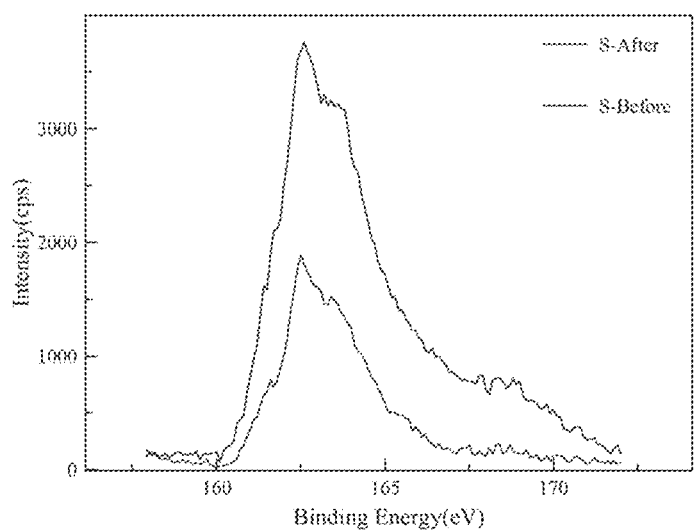
FIG. 9 shows the XPS spectra both before (red line) and after (blue line) treatment with borax.

XPS Results:

XPS is a renowned tool in characterization analysis to understand the components in a material as it measured based on peak positions and intensities. The former helps to deduce the elemental composition while the latter denotes the quantity of the material. The binding energies of the element sulfur in its various forms is expected to be found within the range of 160-178 eV [Ahmed M, Saad M A, Hussein I A, Onawole A T, Mahmoud M. Pyrite Scale Removal using Green Formulations for Oil and Gas Applications: Reaction Kinetics. Energy & Fuels 2019: acs.energyfuels.9b00444. doi:10.1021/acs.energyfuels.9b00444]. FIG. 9 depicts the XPS spectra both before (red line) and after (blue line) treatment with borax. Sulfide occurs within 160 to 163 eV and this peak was observed in both spectra. However, the intensity of the peak is reduced after treatment of the material with borax. This confirms the degradation of pyrite since the sulfide peak has reduced in intensity. Furthermore, another peak was observed around 164 eV in the blue spectrum, which correlates with elemental sulfur and was not observed in the red spectrum. This further substantiates the hypothesis that the sulfide in pyrite has been oxidized to elemental sulfur.

Figure 10:
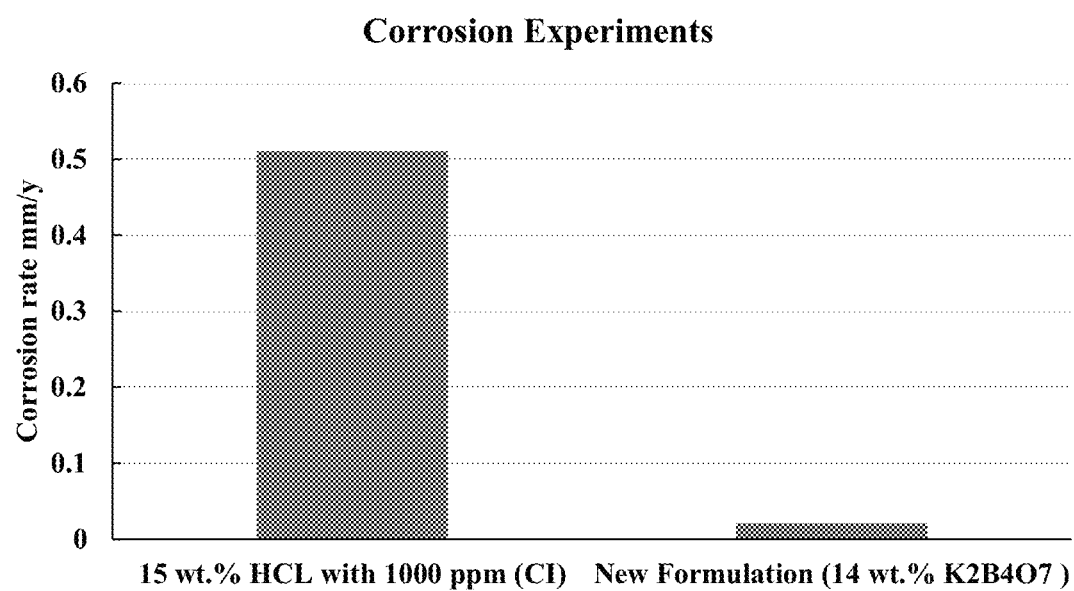
FIG. 10 shows the corrosion rate results for both the new formulation and 15 wt. % HCl with 1000 ppm CI.
Figure 11:
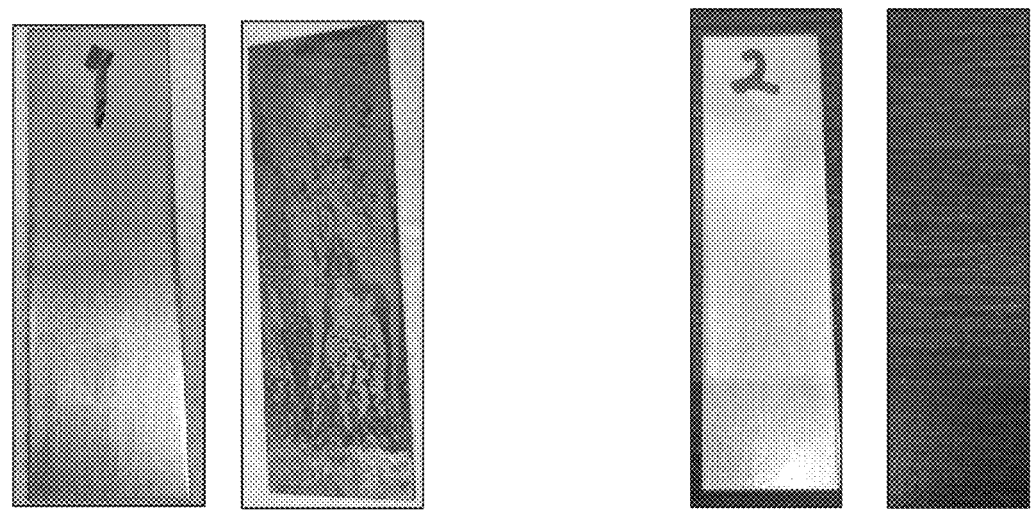
FIG. 11 illustrates the coupons of mild steed before and after treatment with both the a) new formulation and b) 15 wt. % HCl with 1000 ppm corrosion inhibitor.

Corrosion Test Results:

To evaluate the corrosivity of the new formulation, two corrosion experiments were conducted in a rotating disk apparatus RDA. The corrosion experiments were carried out using the new formulation and compared with another one with 15 wt. % HCl with 1000 ppm corrosion inhibitor. The tests were conducted at high temperature that represent deep sour gas wells. Both corrosion tests were performed at 150° C., 1000 psi for 6 hours and under static conditions. The results obtained from the corrosion test showed that the new formulation has corrosion rate lower by 25 times compared to the 15 wt. % HCl with (CI) formulation FIG. 10. In addition, FIG. 11 illustrate the coupons of mild steed before and after treatment with both the new formulation and the 15 wt. HCl with CI. Interestingly, the MS coupon after the treatment with HCl is totally dissolved despite the use of corrosion inhibitor. It is worth mentioning that mild steel has higher corrosion tendency than carbon steel, which is usually used in oil and gas industry, hence, the use of MS here is only to compare purposes. In fact, the actual corrosion rate for the new formulation for carbon steel that used in tubular system in oil and gas industry will be lower the one measured here.

CONCLUSIONS

New green formulation for pyrite scale removal is presented in this study. It composed from potassium tetraborate tetrahydrate with about 14 wt. % concentration.

The effect of temperature, disc rotating speed, borax concentration on the reaction rate of pyrite with new formulation was studied using rotating disc apparatus.

From the rotating disc apparatus experiments results, the pyrite reaction rate using the new formulation increased by about 16% compared to DTPA+$K_2CO_3$ formulation [Mahmoud M, Hussein I A, Sultan A, Saad M A, Buij s W, Vlugt T J H. Development of Efficient Formulation for the Removal of Iron Sulphide Scale in Sour Production Wells. Can J Chem Eng 2018; 9999:1-8. doi:10.1002/cjce.23241].

The new chemical formulation is cheaper than the previous green formulation of DTPA+$K_2CO_3$.

The new developed green formulation is different from what was disclosed in the literature before. Based on the literature search, potassium tetra borate has not been used for pyrite scale removal. The proposed new formulation showed not only better dissolution performance that surpassed the previously disclosed green formulation but also lower cost and corrosion rate in addition to being a green formulation.

The new formulation can be used at concentrations in the range 9 to 20 wt. %. However, the optimum performance for pyrite dissolution was observed when a 14 wt. % was used. For mixed iron sulphide scales, the optimum could vary depending on the composition of the scale. Since this new formulation performed well in removing pyrite, which is the toughest form of iron sulfide scale, it is anticipated to achieve an even better result with other types of iron sulfide scales, which are not as difficult to remove as pyrite and lower concentrations could be used. The new formulation was tested in the temperature range 100 to 150° C. Higher dissolution was obtained at higher temperatures.

Moreover, when Fe2+ has been oxidized to Fe3+. The hexaaquairon formation of Fe3+ which is Fe3+(H2O)6 has a greater positive charge and hence are more attracted to water molecules in the solution than Fe2+(H2O)6. This attraction makes them readily donate to the surrounding water molecules in solution to form an hydroxonium ion (H3O+) and hence, they are more acidic than Fe2+(H2O)6 and consequently more soluble. [J. A. Jafri, J. Logan, M. D. Newton, Ab Initio Study of Inner Solvent Shell Reorganization in the Fe 2+-Fe 3+ Aqueous Electron Exchange Reaction, Isr. J. Chem. 19 (1980) 340-350. doi:10.1002/ijch.198000043; J. Clark, Complex Metal Ions—the Acidity of the Hexaaqua Ions, (2003) 1-9. http://www.chemguide.co.uk/inorganic/complexions/acidity.html #top; N. Scheers, T. Andlid, M. Alminger, A.-S. Sandberg, Determination of Fe2+ and Fe3+ in Aqueous Solutions Containing Food Chelators by Differential Pulse Anodic Stripping Voltammetry, Electroanalysis. 22 (2010) 1090-1096. doi:10.1002/elan.200900533].

The formulation can be modified by adding a chelating agent to enhance solubility of iron oxides.

More and related details of this disclosure can be found in U.S. patent application Ser. No. 15/697,888, which is incorporated here by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A composition for iron sulfide scale removal, the composition consisting essentially of a potassium tetraborate tetrahydrate ($K_2B_4O_7$-$4H_2O$), wherein the potassium tetraborate tetrahydrate ($K_2B_4O_7$-$4H_2O$) is in a concentration of about 9 wt. %-20 wt. % of the composition.

2. The composition of claim 1, wherein the concentration of the potassium tetraborate tetrahydrate ($K_2B_4O_7$-$4H_2O$) is about 14 wt. % to less than 20 wt. % of the composition.

3. The composition of claim 1, wherein the concentration of the potassium tetraborate tetrahydrate ($K_2B_4O_7$-$4H_2O$) is about 14 wt. % of the composition.

4. The composition of claim 1, wherein the concentration of the potassium tetraborate tetrahydrate is greater than 9 wt. % to about 14 wt. %.

5. A method comprising:
  providing a composition consisting essentially of a potassium tetraborate tetrahydrate ($K_2B_4O_7\cdot 4H_2O$), wherein the potassium tetraborate tetrahydrate ($K_2B_4O_7\cdot 4H_2O$) is in a concentration of about 9 wt. %-20 wt. % of the composition; and
  using the composition to dissolve iron sulphide scale.

6. The method of claim 5, wherein the iron sulphide scale comprises pyrite.

7. The method of claim 5, wherein the potassium tetraborate tetrahydrate ($K_2B_4O_7\cdot 4H_2O$) is about 14 wt. % of the composition.

8. The method of claim 5, wherein no toxic hydrogen sulphide ($H_2S$) is generated.

9. The method of claim 4, which is performed at about 100-150° C. and about 500-2000 psi.

10. The method of claim 5, which is performed at about 150° C. and about 1000 psi.

11. The method of claim 4, which is performed for about 0.5-10 hours.

12. The method of claim 5, which is performed for about 0.5 hour.

13. The method of claim 5, which is performed for about 6 hour.

* * * * *